Patented Aug. 23, 1938

2,128,153

UNITED STATES PATENT OFFICE 2,128,153

POLYAZO DYESTUFFS

Hans Schindhelm, Frankfort-on-the-Main-Fechenheim, and Carl Theo Schultis, Bergen, near Frankfort-on-the-Main, Germany, assignors to General Aniline Works, Inc., New York, N. Y., a corporation of Delaware No Drawing. Application July 7, 1936, Serial No. 89,456. In Germany August 3, 1935

2 Claims. (Cl. 260—155)

Our present invention relates to polyazo dyestuffs more particularly to those of the general formula:

wherein R stands for a radicle of the benzene series which contains in ortho-position to the azo group a hydroxy or substituted hydroxy group and $R_1$ for the radicle of a 2-amino-5-hydroxynaphthalene-7-sulfonic acid compounds.

The present new polyazo dyestuffs are obtained by combining diazo compounds with 5-aminoquinoline, further diazotizing the amionazo dyestuff formed and coupling it with an aminohydroxynaphthalene sulfonic acid compound.

The new dyestuffs dye the vegetable fibers fast bluish to violet shades and are capable of forming copper complex compounds which are distinguished by an excellent fastness to light.

In order to further illustrate our invention the following example is given, the parts being by weight and all temperatures in degrees centigrade. However, we wish it to be understood that our invention is not limited to the particular products nor reaction conditions mentioned therein.

Example

The diazo compound formed from 203 parts by weight of 2-amino-anisol-4-sulfonic acid is combined with a cooled hydrochloric acid solution of 150 parts by weight of 5-aminoquinoline. Then sodium acetate is added until the mixture has only a slightly acid reaction. The amino-azo dyestuff formed is isolated and may be purified by redissolving it and precipitating it again. It is diazotized and the diazo compound is added to a solution of 400 parts by weight of the sodium salt of 2-(3'-carboxyphenyl-amino)-5-naphthol-7-sulfonic acid with the addition of pyridine.

The secondary diazo dyestuff formed of the formula:

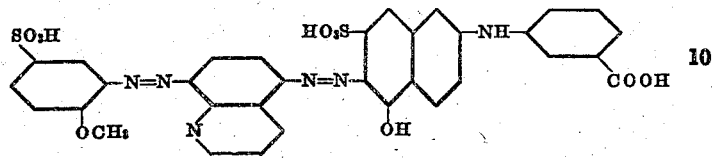

is, when dry, a dark powder, soluble in water with a violet and in concentrated sulfuric acid with a green color and it dyes cotton violet shades, turning to a greenish blue of an excellent fastness to light when the dyestuff is converted into its metallic complex compounds.

We claim:

1. Polyazo dyestuffs of the general formula:

wherein R stands for a radicle of the benzene series which contains in ortho-position to the azo group a hydroxy or substituted hydroxy group and $R_1$ for the radicle of a 2-amino-5-hydroxynaphthalene-7-sulfonic acid compound which dyestuffs dye the vegetable fibers fast bluish to violet shades and are capable of forming copper complex compounds which are distinguished by an excellent fastness to light.

2. A polyazo dyestuff of the formula:

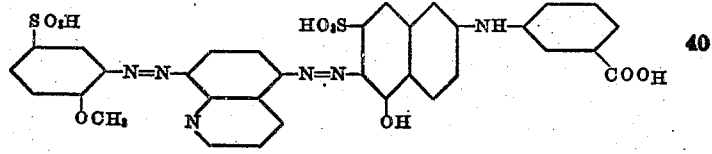

which dyestuff is, when dry, a dark powder, soluble in water with a violet and in concentrated sulfuric acid with a green color and dyes cotton violet shades, turning to a greenish blue of an excellent fastness to light when the dyestuff is converted into its metallic complex compounds.

HANS SCHINDHELM.
CARL THEO SCHULTIS.